US005425978A

United States Patent [19]

Berneth et al.

[11] Patent Number: 5,425,978

[45] Date of Patent: Jun. 20, 1995

[54] SUBSTRATES SECURE AGAINST UNAUTHORIZED COPYING AND PROCESSES FOR THEIR PREPARATION

[75] Inventors: Horst Berneth; Uwe Claussen, both of Leverkusen, Germany

[73] Assignee: Bayer Aktiengesellschaft, Leverkusen, Germany

[21] Appl. No.: 139,494

[22] Filed: Oct. 19, 1993

[30] Foreign Application Priority Data

Oct. 26, 1992 [DE] Germany ........................ 42 36 143.5

[51] Int. Cl.$^{6}$ ................................................ B32B 3/00

[52] U.S. Cl. ...................................... 428/195; 428/29; 428/199; 428/207; 428/211; 428/915; 428/916; 283/902

[58] Field of Search ............... 428/211, 913, 916, 195, 428/199, 29, 915, 207; 283/93, 94, 95, 902; 355/133

[56] References Cited

U.S. PATENT DOCUMENTS 4,427,627 1/1984 Guerlet et al. ....................... 420/496

FOREIGN PATENT DOCUMENTS 518156 2/1980 Australia .
0428828 5/1991 European Pat. Off. .
1407065 9/1975 United Kingdom .

*Primary Examiner*—Patrick J. Ryan
*Assistant Examiner*—William A. Krynski
*Attorney, Agent, or Firm*—Sprung Horn Kramer & Woods

[57] ABSTRACT

Novel substrates bearing visible information applied thereto give indiscernible, for example illegible, photocopies when the information applied using colorant combinations of at least one emitting and at least one reflecting colorant whose shades upon viewing without fluorescence being perceived are similar or identical.

7 Claims, No Drawings

SUBSTRATES SECURE AGAINST UNAUTHORIZED COPYING AND PROCESSES FOR THEIR PREPARATION

The invention relates to substrates secure against unauthorised copying and processes for their preparation.

There is a long-felt want for effective security against unauthorised copying. Thus, the literature contains a whole series of different proposals. Most of them are based on colouring the background of the original in order to lower the contrast. Since the human eye and the sensor in the machine have different sensitivities for the brightness values of the colours, the attempt has been made to darken the background during copying to a relatively larger extent for the sensor than for the eye. Not only reflecting dyestuffs, in particular reds, but also fluorescent dyestuffs have been mentioned for this purpose. A different route is described, for example, by U.S. Pat. No. 4,427,627. There, the original is coated with a photoelectrically switchable layer which darkens upon exposure to light. However, the disadvantage of this method is that the original is no longer legible in bright light. None of these proposals have achieved general acceptance, probably because that all seeing is based on the perception of contrasts, which is why it will always be difficult to achieve a compromise between the legibility of an original and its copyproofness by reducing the contrast. Ultimately, only an illegible original is copyproof.

The introduction of colour copiers has further aggravated the problem. Colours provide rapidly discernible information and are therefore widely used for marking, tagging, coding of articles, and the like. A particular problem is the copying of securities, identity cards or the like by means of colour copiers.

The present invention, then, provides a novel process for copyproofing coloured originals which exploits the difference in sensitivity between the eye and the machine's sensor in a surprising manner. While the eye does not distinguish between reflected and emitted radiation and perceives both as part of the overall colour sensation, the sensor only measures absorption and is blind to emitted radiation. This leads to a difference in the determination of the colour locus compared with the eye's perception and the surprising effect of colour identity for eye or sensor.

Since the perceived brilliance of a fluorescent colour cannot be matched by mixing reflection colours, the difference remains even when the image is corrected here and there, for example by correcting the filter settings. It could only be compensated by a toner containing a fluorescent dyestuff. This would, however, require a sensor system which distinguishes between emitting and reflecting colours.

The eys's ability to perceive a change in colour locus is relative. In a comparison with the original shade, very small changes can still be safely recognised, while in the absence of comparable shades even relatively large changes, in particular in lightness, are no longer safely discernible.

The invention, then, is directed to selecting an emitting and a reflecting colorant in such a manner that their shades upon viewing without fluorescence being perceived are similar or identical.

The invention relates to substrates bearing visible information applied thereto which are secure against unauthorised copying and are characterised in that the information was applied using a colorant combination of at least one emitting and at least one reflecting colorant such that their shades upon viewing without fluorescence being perceived are similar or identical, the information having been applied by means of the colorant combination in such a manner that the various colour fields touch or are close to one another.

The invention further relates to processes for securing substrates bearing visible information applied thereto against unauthorised copying, which is characterised in that the information is applied using a colorant combination of at least one emitting and at least one reflecting colorant such that their shades upon viewing without fluorescence being perceived are similar or identical, the information being applied by means of the colorant combination in such a manner that the various colour fields touch or are close to one another.

In a substrate according to the invention, a pattern produced from a colorant combination according to the invention, if recognisable in the original, appears as a monochromic spot in the copy. For this a plurality of colorant combinations can be used simultaneously in order that complex colour patterns may be produced.

The reflection colorant can be composed of a plurality of colorants, thus making it possible to match the shade exactly to the retroreflection spectrum of the emissive component.

Suitable colorants for combinations usually are similar in their absorption spectra as regards position and band shape. The position of the absorption maxima should not be more than 30 nm, preferably not more 20 nm, apart. The half-wave width of the dyestuffs in solution, i.e. the spectral width of the longest-wavelength band at half the maximum absorbance ($\epsilon/2$ at $\lambda_{max}$) should be $<150$ nm, preferably $<100$ nm.

The fluorescent colorant can also consist of mixtures which, however, must be composed such that no absorption takes place within the emission band. They will preferably be colorants absorbing similarly to the reflection colorant.

One way of applying the invention consists in printing a pattern on paper with the emitting and reflecting colorant in which the areas printed with the different colorants should touch or be close to one another. The printing ink contains the colorants as colour pigments or as dyestuff-coloured plastic powders or polymer dispersion in binders customary for printing inks. The printing ink can also contain the dyestuffs in dissolved form.

Examples of suitable plastic powders are polyacrylonitrile, polyester, polycarbonate, epoxy resins, melamine/formaldehyde resins; examples of suitable dispersions are styrene acrylates, polyurethanes and polyureas.

Suitable pigments are all colour pigments; preferably organic colour pigments. A particular form are the salts of cationic dyestuffs with insolubilising acids such as molybdophosphate, tungstophosphate, molybdosilicate, tungstosilicate or suitable organic carboxylic or sulphonic acids.

Suitable dyestuffs for colouring the plastic powders or polymer dispersions are any neutral or cationic dyestuffs which dissolve in these media or colour them efficiently by salt formation or can be incorporated in the polymer via reactive groups.

Another way of applying the invention consists in colouring paper with one dyestuff and printing a pattern with the other. Preferably, the reflecting dyestuff is used for colouring the paper. The printing ink can be composed as described above. Alternatively, the printing ink can be a solution of the dyestuff in microencapsulated form.

Suitable dyestuffs for colouring the paper are any cationic or anionic dyestuffs which have affinity for cellulose fibres. Suitable dyestuffs for microcapsules are any neutral dyestuffs which are sufficiently soluble in the solvents customary for microencapsulation, such as aliphatic, aromatic and chlorinated hydrocarbons. As well as paper, any paper-like substances, such as nonwovens, but also plastic sheets are suitable. Paper is preferred.

EXAMPLE 1 a) 20 g of polyacrylonitrile powder were coloured at 90° C. in water at a pH of 4 with 150 mg of the dyestuff of the formula

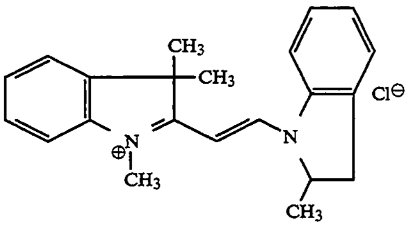

and then dried.

b) Example a) was repeated, using 110 mg of the dyestuff of the formula

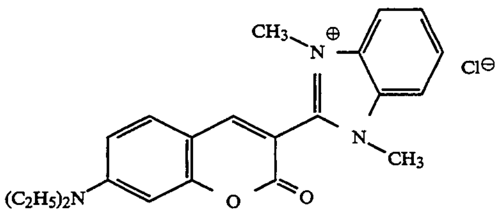

c) 1 g of the powder coloured under b) was dispersed in 6 g of 5% strength aqueous polyvinyl alcohol solution. The number "10" was written on paper using a paintbrush.

d) Using a dispersion of the powder from a) prepared as under c), a square field was painted around the number "10" and the inside of the "0" was painted in such a manner that this field made direct contact with the figures.

e) The eye could clearly read the "10" as a greenish yellow fluorescent colour surrounded by yellow.

f) A colour copy of this original was produced in a colour copier. The entire field, including the number "10", was reproduced in a uniform yellow, so that the "10" could no longer be recognised.

EXAMPLE 2

The number "10" was painted using the dispersion from c) of Example 1, and the surrounding field was painted using the dispersion from d) of Example 1. In this case, too, the eye could clearly read the number, which, however, disappeared on the colour copy.

EXAMPLES 3-7

Examples 1 and 2 were repeated, using the following pairs of dyestuffs:

| Example | Dyestuff 1 (F1) | Dyestuff 2 (F2) | Viewing with the eye F1 | Viewing with the eye F2 | Color copy F1 | Color copy F2 |
|---|---|---|---|---|---|---|
| 3 | 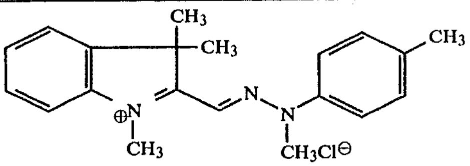 | 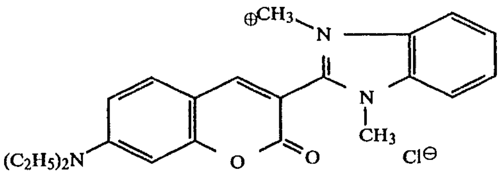 | yellow | greenish yellow fluorescent | yellow | yellow |
| 4 | 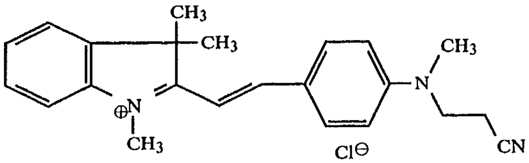 | 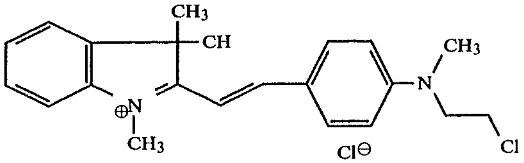 | pink fluorescent | violet, weakly fluorescent | violet | violet |
| 5 | " | 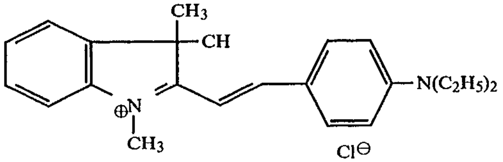 | pink fluorescent | bluish violet | " | " |
| 6 | 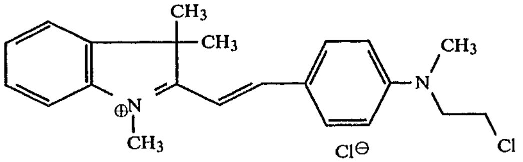 | " | violet weakly fluorescent | " | " | " |
| 7 | 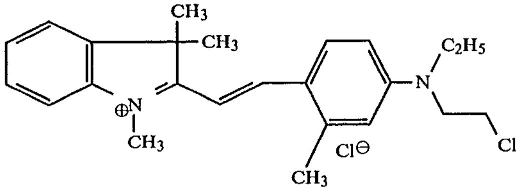 | " | pink weakly fluorescent | " | " | " |

EXAMPLE 8 a) 100 mg of the dyestuff of the formula

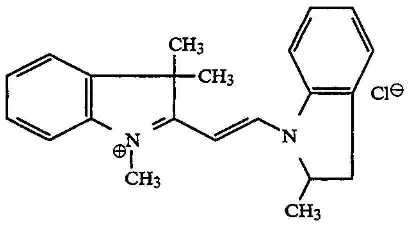

were dissolved in 100 ml of a 5% strength solution of polyvinyl acetate in acetone. The number "10" was painted on paper using a paintbrush.

b) Similarly, the inside of the "0" and a square field was painted around the "10" with a solution of the dyestuff of the formula

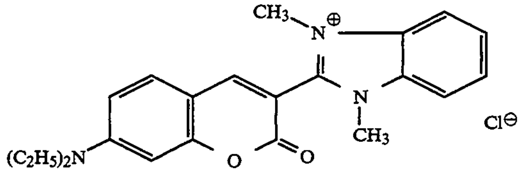

in such a manner that no gap was formed between the painted areas.

c) The eye could clearly read the yellow "10" within the greenish yellow fluorescent surroundings.

d) However, a colour copy of this original produced in a colour copier only showed a uniformly yellow field in which the "10" could not be made out.

The dyestuffs used in Examples 3–7 can be used analogously.

EXAMPLE 9 a) 20 g of polyester powder were coloured at 100° C. in water with 120 mg of the dyestuff of the formula

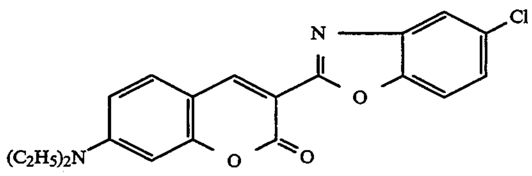

and then dried.

b) Example a) was repeated, using 250 mg of the dyestuff of the formula

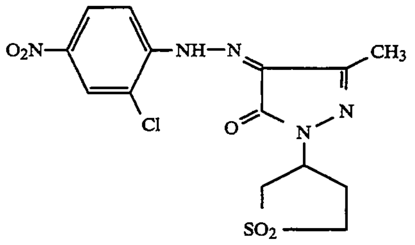

c) 1 g of the powder dyed in a) was dispersed in 6 g of 5% strength aqueous polyvinyl alcohol. A "2" was painted on paper using a paintbrush.

d) Using a dispersion of the powder from b) prepared as in c), a square field was painted around the number "2" in such a manner that the two coloured areas made contact with one another without leaving a gap.

e) A greenish yellow fluorescent "2" in the yellow surroundings could be clearly recognised with the eye.

f) A colour copy produced in a colour-copying machine showed a uniformly yellow field in which the "2" was no longer visible.

What is claimed is:

1. Substrates bearing visible information applied thereto which are secure against unauthorized copying, whereas the information was applied using a colorant combination of at least one emitting and at least one reflecting colorant such that their shades upon viewing without fluorescence being perceived are similar or identical, the information having been applied by means of the colorant combination in such a manner that the various colour fields touch or are close to one another and wherein the absorption maxima of the colorants of a combination are not more than 30 nm apart.

2. Substrates according to claim 1, whereon more than one reflection colorant is used.

3. Substrates according to claim 1, consisting of paper.

4. Substrates according to claim 3, wherein the reflection colorant is applied by direct coloration and the emission colorant is applied in microencapsulated form.

5. Substrates according to claim 1, whereon the information is applied by writing or printing.

6. Substrates according to claim 1, whereon the colorants are applied as pigments or coloured plastic powders or polymer dispersions.

7. Substrates according to claim 1, whereon the absorption maxima are not more than 20 nm apart.

* * * * *

UNITED STATES PATENT AND TRADEMARK OFFICE

CERTIFICATE OF CORRECTION

PATENT NO. : 5,425,978

DATED : June 20, 1995

INVENTOR(S) : Berneth, et al.

It is certified that error appears in the above-indentified patent and that said Letters Patent is hereby corrected as shown below:

Title Page U.S. PATENT DOCUMENTS: Insert

| | | | |
|---|---|---|---|
| -- 5,197,765 | 3/1993 | Mowry Jr. et al. | 283/93 |
| 5,149,140 | 9/1992 | Mowry Jr. et al. | 283/93 |
| 4,791,449 | 12/1988 | Foley et al. | 355/3R |
| 4,739,377 | 4/1988 | Allen | 355/133 |
| 4,281,921 | 8/1981 | Van Auken | 355/77 |
| 3,887,742 | 6/1975 | Reinnagel | 428/211 -- |

Signed and Sealed this

Fifth Day of September, 1995

Attest:

BRUCE LEHMAN

*Attesting Officer*

*Commissioner of Patents and Trademarks*